United States Patent
Ochiai

[11] 3,922,022
[45] Nov. 25, 1975

[54] SKID CONTROL BRAKING SYSTEM

[75] Inventor: Takeshi Ochiai, Toyota, Japan

[73] Assignee: Toyota Jidosha Kogyo Kabushiki Kaisha, Japan

[22] Filed: Jan. 14, 1974

[21] Appl. No.: 433,004

[30] Foreign Application Priority Data
Feb. 9, 1973  Japan.................. 48-15679

[52] U.S. Cl. ............................ 303/21 P; 303/20
[51] Int. Cl.$^2$ ............................... B60T 8/08
[58] Field of Search................ 188/181; 235/150.2; 303/20, 21; 307/10 R, 233 B; 317/5; 324/161–162; 340/53, 62, 262–263

[56] References Cited
UNITED STATES PATENTS

| | | | |
|---|---|---|---|
| 3,494,671 | 2/1970 | Slavin et al. | 303/21 P |
| 3,540,781 | 11/1970 | Okamoto et al. | 303/21 BE |
| 3,545,817 | 12/1970 | Yarber | 303/20 X |
| 3,578,819 | 5/1971 | Atkins | 303/21 BE |
| 3,758,166 | 9/1973 | Kuwana et al. | 303/20 X |
| 3,767,270 | 10/1973 | Urban | 303/21 BE |
| 3,768,872 | 10/1973 | Urban et al. | 303/21 BE |
| 3,819,004 | 6/1974 | Adde | 303/20 X |

Primary Examiner—Trygve M. Blix
Assistant Examiner—Stephen G. Kunin
Attorney, Agent, or Firm—Toren, McGeady and Stanger

[57] ABSTRACT

A modulator modulates the brake forces that a brake system applies to a number of a vehicle's wheels, on the basis of a control signal. The latter is derived in part by sensing the wheels' speeds to generate composite wheel speed signals and by generating reference signals which respond to the composite signals but which are variable at a slower rate than the composite signals. The control signal is finally derived by combining the difference between the composite and reference signals and the difference between the respective differentials of the composite and reference signals. A modulation rate regulator responds to the control signals to change the rate at which the control signal modulates the brake forces on the basis of the control signal. According to an embodiment the system operates with the front wheels and a second similar system with a second modulator and control signal operates upon the rear wheels. A common reference signal is formed from the speeds of all the wheels.

38 Claims, 7 Drawing Figures

SKID CONTROL BRAKING SYSTEM

BACKGROUND OF THE INVENTION

This invention relates to conveyances and particularly to antiskid devices for vehicles such as automobiles.

Such antiskid devices respond to abrupt application of a vehicle's brakes by regulating the brake fluid pressure in conformance with the condition of the road surface, regardless of the force applied to the brake pedal. This prevents the wheels from locking and avoids loss of control of the vehicle.

While antiskid devices of the type described above must prevent "wheel lock" they are also required to stop the vehicle within as short a distance as possible. To achieve these ends, the vehicle braked should be operated under conditions in which the coefficient of friction between the wheel and the road surface is maximum. It is generally known that the maximum coefficient of friction occurs when the ratio of the wheel velocity, or more precisely, the linear speed at the wheel circumference to the vehicle velocity, lies in the range of 0.80 to 0.85 (in other words, when the slip ratio of the wheel is in the range of 0.15 to 0.20).

Conventional skid control devices are constructed to attain efficient vehicle deceleration by first detecting the vehicle velocity and then constraining the wheel velocity to assume a value in the range between 0.80 and 0.85 of the vehicle velocity. For detecting the vehicle velocity, these known devices employ various methods and means such as for example, one in which the vehicle velocity is obtained by a radar ground speedometer or integrating a vehicle deceleration signal. Practically however, these conventional vehicle velocity detecting schemes have not been satisfactory. In the former device the radar beam intensity varies widely depending on the road surface conditions. Also the vehicle body's departure from a level orientation adversely affects the speed detection. Similarly in the latter method the detected vehicle velocity value is erroneous when performed on a sloping road.

Regulating the wheel velocities by using signals based on such erroneous vehicle velocities causes the wheel to rotate irregularly and shocks the vehicle body. Moreover, known devices regulate the pressure of brake fluid transmitted from the master cylinder to the wheel cylinders by simply repeating the same brake pressure increases and decreases. Therefore they have the defect of sometimes overpressurizing the brake fluid and locking the wheels or lowering the brake fluid pressure excessively. The resulting lack of brake force lengthens the time and distance within which the vehicle can be stopped.

Furthermore, conventional devices have not been satisfactory from the standpoint of safety because most are designed to control either only the front wheels or the rear wheels.

It is an object of the invention to improve conveyances.

Another object of the invention is to improve antiskid devices.

Still another object of the present invention is to provide an antiskid device which positively avoids wheel lock and thereby assures safe vehicle operation.

Another object of the invention is to avoid the aforementioned disadvantages.

SUMMARY OF THE INVENTION

According to a feature of the invention, these objects are attained, in whole or in part, by modulating the brake force that a brake system applies to wheels of a vehicle on the basis of a control signal. Circuit means derive this signal in part by sensing the wheels' speeds to generate a composite wheel speed signal and by generating a reference signal from the composite signal, but which can vary only at a slower rate than the composite signal. Control signal forming means finally derive the control signal by combining the difference between the composite and reference signals and the difference between the respective differentials of the composite and reference signals. A modulation brake regulator responds to the control signals to vary the speed at which the control signal modulates the brake force, on the basis of the value of the control signal.

According to another feature of the invention the brake forces to other wheels of the vehicle are modulated on the basis of a second control signal. The circuit means and forming means form the second control signal by generating a second composite speed signal and combining the difference therebetween the second composite signal and the reference signal and the difference between their differentials.

According to another feature of the invention the circuit means includes multiplying the composite signal by a predetermined factor to obtain the reference signal.

According to another feature of the invention the signal forming means includes means for multiplying each of the differences by a coefficient before combining them.

These and other features of the invention are pointed out in the claims. Other objects and advantages of the present invention will become apparent from the following description, taken in connection with the accompanying drawings illustrating by way of example preferred embodiments of the invention.

DESCRIPTION OF THE PREFERRED EMBODIMENT

Figure 1:
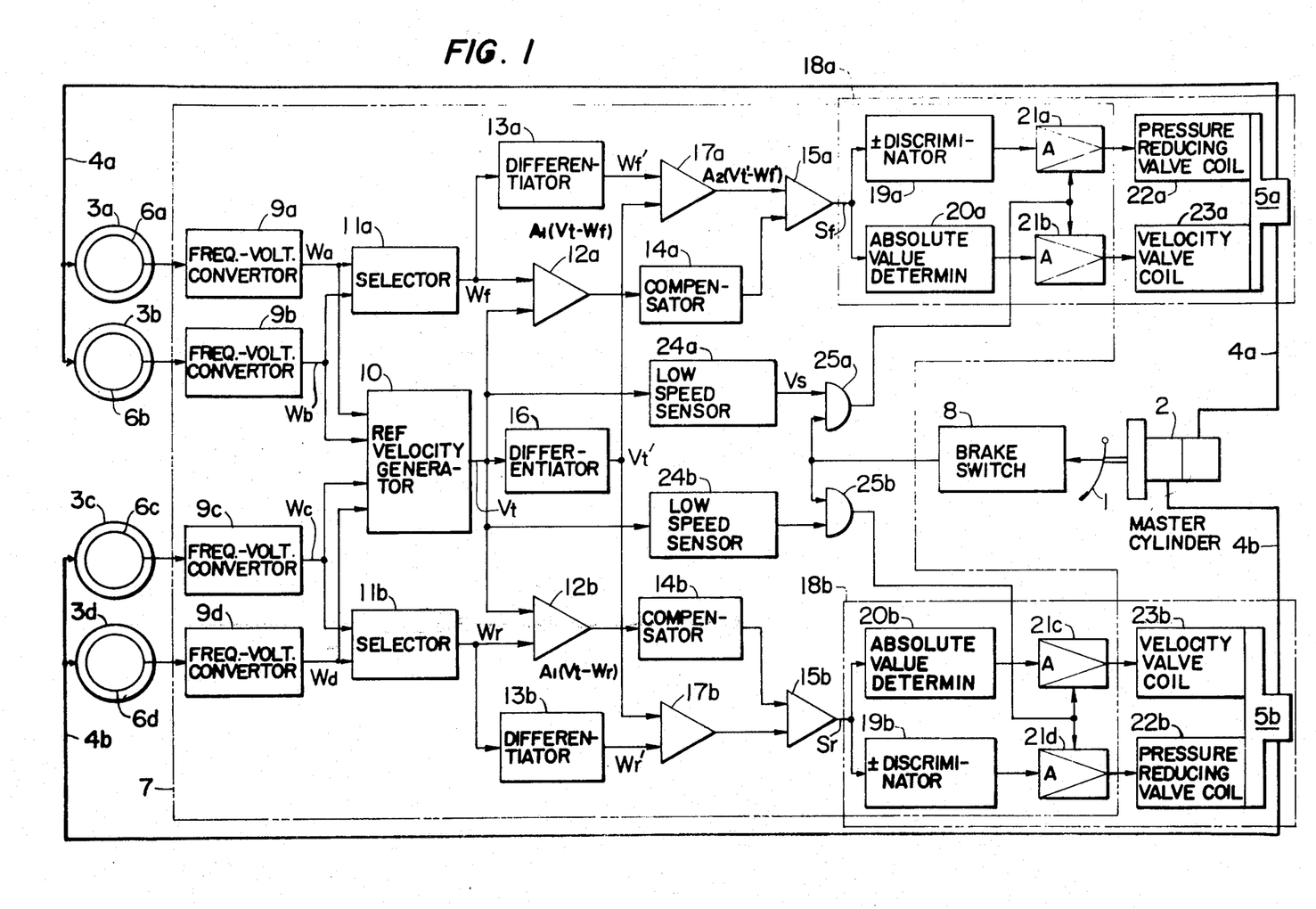
FIG. 1 is a block diagram, showing the construction of an antiskid device embodying features of the present invention.

In FIG. 1 a brake pedal 1 actuates a master cylinder 2. The latter operates respective wheel cylinders (not shown) of two front wheels 3a and 3b and two rear wheels 3c and 3d through oil conduits 4a and 4b, respectively. When an operator depresses the brake pedal 1 to stop the vehicle, the master cylinder 2 discharges brake fluid and transmits pressure to the wheel cylinders of the wheels 3a to 3d and thereby applies braking force to these wheels. Here, the quantity of the brake fluid discharged by the master cylinder 2 is proportional to the extent to which the pedal 1 is pressed downward.

Pressure modulators 5a and 5b interposed in the conduits 4a and 4b modulate the pressure applied to the brake cylinders. Known rotation sensors 6a to 6d coupled respectively to the wheels 3a to 3d generate respective pulse signals at a frequencies proportional to the wheel speeds. When the brake pressure is applied abruptly, and when the output signals of the rotation sensors 6a to 6d warn of occurrence or imminence of wheel lock in either of the four wheels, a controller circuit 7 causes the pressure modulators 5a and 5b to reduce the brake pressure.

The upper half of the controller circuit 7, as viewed in FIG. 1, controls the front wheel pressure modulator 5a in response to the output signal of the front wheel rotation sensors 6a and 6b. This upper half is identical in construction and operation to the lower half which controls the rear wheel pressure modulator 5b in response to the output signals of the rear wheel rotation sensors 6c and 6d. Thus only the upper half of the circuit is described. In controller circuit 7, frequency-voltage converts 9a and 9b generate front wheel velocity signals Wa and Wb by converting the frequencies of the pulse signals from sensors 6a and 6b into direct current voltage signals proportional to the respective velocities of the front wheels 3a and 3b. The converters 9a and 9b both apply their outputs Wa and Wb to a reference velocity generator 10 and a selector 11a.

Figure 2:
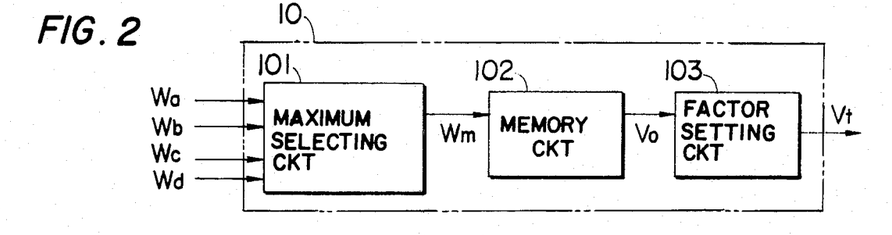
FIGS. 2 and 2A are block diagrams of reference velocity generators in accordance with the principles of the present invention.

The reference velocity generator 10 is diagramatically illustrated in FIG. 2. The front wheel velocity signals Wa and Wb as well as rear wheel velocity signals Wc and Wd similarly generated by frequency-voltage converters 9c and 9d, are simultaneously supplied as inputs to a maximum selecting circuit 101. The latter selects the maximum from among the signals Wa to Wd and generates an output signal Wm. The maximum of the velocities of the four wheels is the one most closely approximating the vehicle velocity, because the wheel velocities cannot exceed the vehicle velocity during braking.

A memory circuit 102 connected to the maximum selecting circuit 101 memorizes the output signal Wm of the circuit 101 and produces an output signal Vo. Thus, if braking does not cause a wheel to lock and deceleration of the signal Wm is low, the signal Wm constitutes the output signal Vo of the memory circuit 102. On the other hand, if one of the wheels locks and the signal Wm decreases rapidly, or if all of the four wheels lock simultaneously, the memory circuit 102 varies the output signal Vo to indicate that the vehicle is decelerated at a rate of 1g. The value g is the acceleration of gravity which represents the maximum deceleration the vehicle can achieve. Experiments have shown that the signal Vo thus obtained represents a vehicle velocity corresponding to 90 to 100 percent of the actual vehicle velocity, and consequently the signal Vo may be considered to be approximately equal to the actual vehicle velocity.

As previously discussed, the maximum coefficient of friction between a wheel and a road surface occurs when the ratio of the wheel velocity to the vehicle velocity lies in the range of 0.80 to 0.85. A factor setting circuit 102 uses this fact and multiplies the vehicle velocity Vo by a factor $n$ (where $n$ is a value in the range of 0.80 to 0.85). The factor setting circuit 103 thus generates a reference velocity signal Vt for controlling the wheel velocity.

Figure 2A:
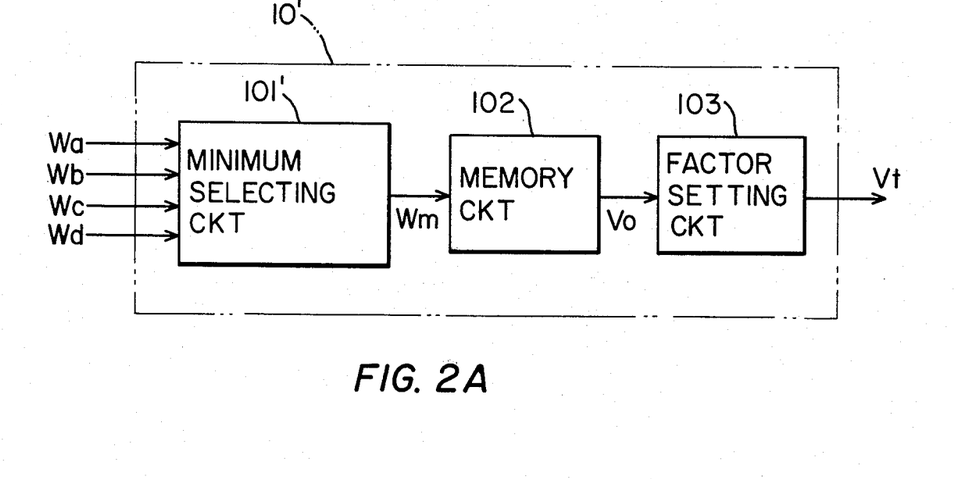

FIG. 2A illustrates another embodiment of the reference velocity generator. Here the generator 10' corresponds to the generator 10 with the exception that the circuit 101 is replaced with a minimum selecting circuit 101'.

In the controller circuit 7, a selector 11a selects the lower one of the two wheel speed signals Wa and Wb to produce a front wheel velocity signal Wf. According to another operating mode, the selector 11a selects the higher one of the two wheel speed signals Wa and Wb. According to yet another operating mode, the selector 11a takes the arithmetic mean of the geometric mean of the two velocity signals Wa and Wb to generate the front wheel velocity signal Wf. Which of these values is employed as the front wheel velocity signal Wf, i.e. which operating mode is used, depends on which aspect of the performance of the antiskid device is considered most important. The mode involving selection of the lower velocity signal improves the stability of the vehicle. The mode which involves selecting the higher velocity signal shortens the braking distance. Using either the arithmetic or geometric mean frees the antiskid device from being seriously affected by erroneous signals such as noise.

A subtracting circuit 12a coupled to the outputs of the reference velocity generator 10 and the selector 11a subtracts the signal Vt from the signal Wf to produce an output signal $Vt - Wf$. An adding circuit 15a receives the signal $Vt - Wf$ via a compensator 14a which adjusts the signal $Vt - Wf$ so that it will not exceed a predetermined value when the signal Wf is lowered to an extreme value by wheel lock.

The output Wf of the selector 11a is also applied to a subtractor 17a via a differentiator 13a which differentiates the signal Wf and produces an output signal Wf'. On the other hand, the subtractor 17a also receives the output of a differentiator 16 which differentiates the signal Vt from the reference velocity generator 10 and produces an output signal Vt'. Thus, the subtractor means 17a subtracts signal Wf' from signal Vf' and produces an output signal $Vt' - Wf'$, and in turn feeds the signal $Vt' - Wf'$ to the adding circuit 15a. Here, it will be understood that Vt' and Wf' represent $dVt/dt$ and $dWf/dt$, respectively.

The adding circuit 15a multiplies the terms $Vt - Wf$ and $Vt' - Wf'$ by factors $A_1$ and $A_2$ respectively and adds $A_1(Vt - Wf)$ to $A_2(Vt' - Wf')$. The result of the calculation $A_1(Vt - Wf) + A_2(Vt' - Wf')$ is fed to an electro-hydraulic servo circuit 18a as an input control signal Sf.

The electro-hydraulic servo circuit 18a is composed of a plus-minus discriminator 19a, an absolute value determining device 20a, amplifiers 21a and 21b for amplifying the control signal Sf, and the above-mentioned pressure modulator 5a which includes a pressure reducing valve coil 22a and a velocity valve coil 23a. The plus-minus discriminator 19a senses whether the control signal Sf is positive or negative. In case it is positive, the discriminator 19a applies an electric current to the pressure-reducing valve coil 22a via the amplifier 21a. Pressure of the brake fluid is thus reduced by the pressure modulator 5a.

The absolute value determining device 20a measures the absolute value of the control signal Sf. If it exceeds a predetermined level K the device 20a acts to apply an electric current to the velocity valve coil 23a via amplifier 21b. This enables the pressure modulator 5a to increase and decrease the pressure of the braking fluid more quickly.

Such arrangement of the electro-hydraulic servo circuit 18a controls the pressure of the braking fluid as follows.

When $Sf$ is larger than zero and smaller than or equal to $K$ (i.e., $0 < Sf \leq K$), the pressure of the braking fluid is decreased slowly. When $Sf$ exhibits the relation $K < Sf$, the pressure of the braking fluid decreases quickly. When $Sf$ exhibits the relation $-K \leq Sf \leq 0$, the pressure increases slowly, and when $Sf$ exhibits the relation $Sf < -K$, the brake pressure increases quickly. According to another embodiment of the invention, the electro-hydraulic servo circuit 18a is constructed in a different from utilizing a servo valve, insofar as it functions to vary the control speed of the braking pressure in proportion to the level of the control signal $Sf$.

Serving as a safety device is a low speed sensor 24a which generates a signal $Vs$ when the signal $Vt$ exceeds a predetermined value. A brake switch 8 generates a brake signal when brake pedal 1 is operated. An AND circuit 25a connects low speed sensor 24a and the brake switch 8 to both the amplifiers 21a and 21b. The AND gate produces the logical product of its inputs, and the amplifiers 21a, 21b operate only when both of the signal $Vs$ and the brake signal are generated by the sensor 24a and the brake switch 8. Such arrangement avoids operation of the pressure modulator 5a in response to other erroneous signals.

The construction of the control circuit in the controller 7 responding to the rear wheels is identical to that just described for the front wheels. Thus the rear wheel control circuit includes similar frequency-voltage converters 9c and 9d for producing DC voltage signals $Wc$ and $Wd$ proportional to the rear wheel velocities. A selector 11b selects the lower one of the two velocity signals $Wc$ and $Wd$ and produces a rear wheel velocity signal $Wr$. A subtractor 12b subtracts the signal $Wr$ from the signal $Vt$ and generates an output signal $Vt - Wr$. A differentiator 13b differentiates the signal $Wr$ and produces an output signal $Wr'$. A subtractor 17b subtracts the signal $Wr'$ from the signal $Vt'$ and produces an output signal $Vt' - Wr'$. An adding circuit 15b calculates $A_1(Vt - Wr) + A_2(Vt' - Wr')$ and produces an output control signal $Sr$ in coaction with a compensator 14b. Similarly, a rear wheel electro-hydraulic servo circuit 18b is composed of a $\pm$ discriminator 19b, an absolute value determining device 20b and a pressure modulator 5b which includes amplifiers 21c and 21d, a pressure reducing valve 22b and a velocity valve coil 23b. A low speed sensor 24b and an AND circuit 25b serve as a safety device.

Figures 3, 4A:
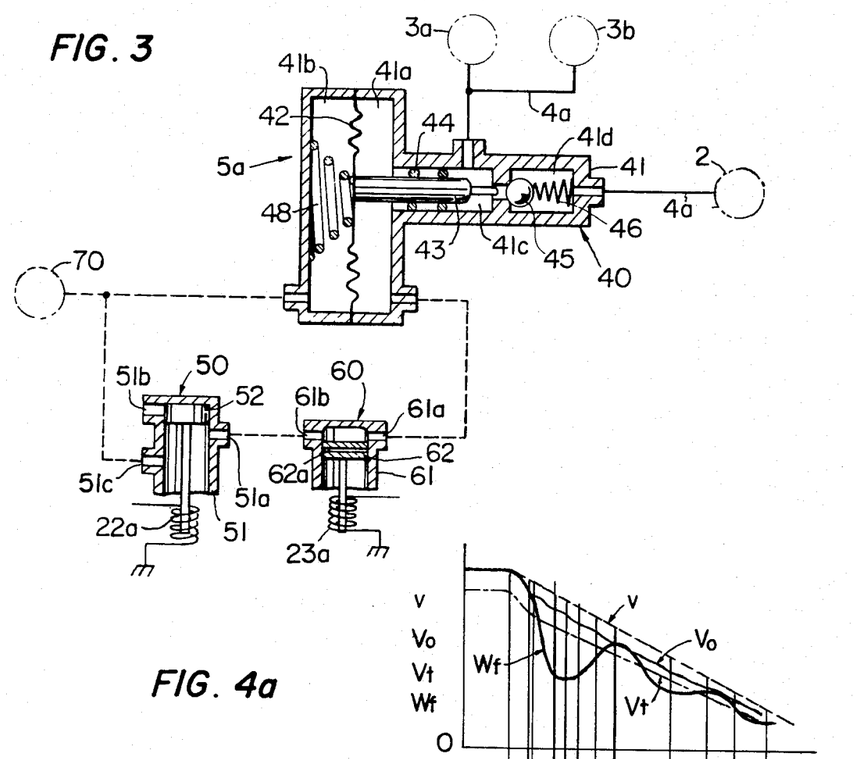
FIG. 3 is a view, showing in section a pressure modulator provided in the antiskid device.
FIGS. 4a to 4c are diagrams showing the operation of of the device.

The pressure modulators 5a and 5b are constructed identically. Thus only the operation of the front wheel pressure modulator 5a is described with reference to FIG. 3. As shown in FIG. 3, the pressure modulator 5a is composed of a pressure modulating section 40, a pressure reducing valve 50, and a velocity valve 60. In the pressure modulating section 40, a cylinder 41 forms an inlet chamber 41d which communicates with the oil conduit 4a from the master cylinder 2. In the cylinder 40, a chamber 41c communicates with the oil conduit 4a passing to the brake cylinders of the front wheels 3a and 3b. The cylinder 41 also forms a work chamber 41a to the left of the modulation chamber 41c and a vacuum chamber 41b separated from the work chamber 41a by a diaphragm 42. The chamber 41b communicates with a vacuum source 70. A check ball 45 spring biased by a spring 46 controls the communication between the inlet chamber 41d and the modulation chamber 41c. A spring 48 in the vacuum chamber 41b applies a spring force to the diaphragm 42 so that a piston 43 operatively connected with the diaphragm 42 displaces the check ball 45 when the diaphragm 42 is displaced to the right. Sealing rings or other means 44 interposed between the cylinder 41 and piston 43 prevent communication (i.e. fluid flow) between the modulation chamber 41c and the work chamber 41a.

In the pressure reducing valve 50, the coil 22a, when energized, moves a valve body 52 downward from its uppermost position in FIG. 3. The valve body 52 establishes communication of a communication port 51a with a communication port 51c leading to the vacuum source 70 or with a communication port 51b opening to the atmosphere, according to its position.

In the velocity valve 60 the coil 23a, when energized, moves a valve body 62 downwardly from its uppermost position to its lowermost position shown in FIG. 3. The valve body forms a passage 62a through itself. Communication ports 61a and 61b communicate with the work chamber 41a of the cylinder 41 and with the communication port 51a of the pressure reducing valve 50 respectively.

When the coil 22a of the pressure reducing valve 50 is deenergized the valve body 52 is driven by means not shown to its uppermost position. The vacuum of the vacuum source 70 is then supplied to the work chamber 41a through the ports 51c and 51a in the valve 50 and the ports 61b and 61a in the valve 60. The spring 48 thus displaces the diaphragm 42 and the piston 43, rigidly connected to the diaphragm, to the right as shown in FIG. 3. Displacement of the piston 43 reduces the volume of the modulation chamber 41c. This increases the pressure in the wheel cylinders of the front wheels 3a and 3b. At the same time the front rod of the piston 43 presses the check ball 45 against the biasing force of the spring 46 to establish communication between the inlet chamber 41d and the modulation chamber 41c.

When the coil 22a of the pressure-reducing valve 50 is energized, the piston 52 moves downwardly to permit communication between the ports 51b and 51a. This introduces atmospheric pressure into the work chamber 41a. The atmospheric pressure displaces the piston 53 to the left as shown in FIG. 3 against the biasing force of the spring 48. Consequently the spring 46 reseats the check ball 45 in its original position as illustrated in FIG. 3. This action again cuts off communication between the inlet chamber 41d and the modulation chamber. The leftward movement of the piston 43 increases the net volume of the modulation chamber, thereby decreasing the pressure of the braking fluid in the brake cylinders of wheels 3a and 3b.

With the valve body 62 moved into its upward position by means not shown while the coil 23a is unenergized, the aforementioned increases and decreases in the brake fluid pressure occur slowly because the restriction of the passage 62a limits the speed with which the work gas can flow into or out of the work chamber 41a to a rate which requires a comparatively long time. On the other hand, when the coil 23a of the velocity valve 60 is energized, the valve body 62 is moved downwardly. This removes the obstruction between the ports 61a and 61b so that gas can move to and from the work chamber 41a without this added resistance. As a result, increases and decreases of the brake fluid pressure can be executed quickly.

Figure 4B:
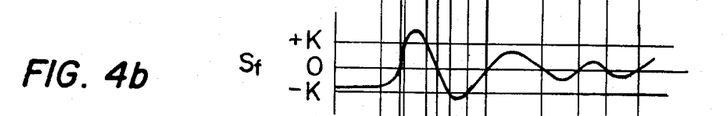
Figure 4C:
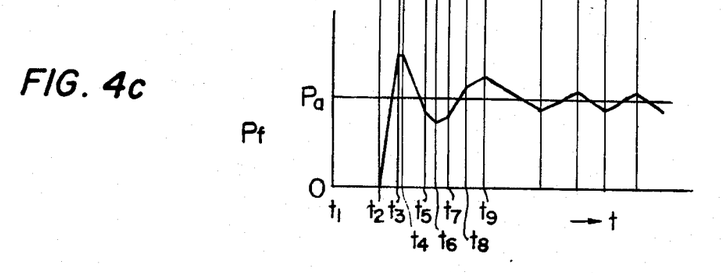

The operation of the antiskid device constructed as described above can best be understood with reference to FIGS. 4a, 4b, and 4c. In these three figures the abscissa represents the time $t$. In FIG. 4a, the ordinate illustrates the actual vehicle velocity $v$, the vehicle velocity signal $Vo$, the reference velocity signal $Vt$, and the front wheel velocity signal $Wf$. FIGS. 4b and 4c illustrate the control signal $Sf$ and brake fluid pressure $Pf$ respectively.

From time $t_1$ to $t_2$ of FIGS. 4a, 4b, and 4c, the vehicle runs at a constant velocity. Therefore, the signals $Vo$ and $Wf$ are substantially equal to the actual vehicle velocity $v$. The signal $Vt$ is lower than these values because it includes the factor $n$. During this time the coils 22a and 23a are unenergized so that pressure in the chambers 41b and 41a is equal. Therefore, the spring 48 drives the piston 43 until it unseats the check ball 45 and opens communication between the mster cylinder 2 and the brake cylinders 3a and 3b.

When an operator subjects the vehicle to abrupt braking at the time $t_2$, the brake fluid pressure in the lines 4a is increased. This causes the brake cylinders at the wheels 3a and 3b to slow the wheels so that the wheel velocity as well as the vehicle velocity is reduced. If, at the time $t_3$, one of the front wheels almost locks, a signal $Wa$ or $Wb$ drops drastically. However, the signal $Vo$ continues at a value slightly lower than the actual vehicle velocity $v$ because the other three wheels do not yet lock. As a result the output signal $Wf$ of the selector 11a is also reduced markedly. Therefore, the output signal $Sf$ of the adding circuit 15a becomes positive and the $\pm$ discriminator 19a produces a signal which energizes the coil 22a of the pressure reducing valve 50. This draws down the valve body 52 and introduces atmospheric pressure to the chamber 51a thereby driving the piston 43 to the left. The pressure modulator 5a thus begins to decrease the brake fluid pressure in the brake cylinders of the wheels 3a and 3b.

At a time $t_4$ subsequent to the time $t_3$, the signal $Sf$ which continuously increases its level from the time $t_2$ reaches and exceeds the level $K$ preset in the absolute value determining device 20a. The latter then produces a signal which energizes the coil 23a of the velocity valve 60. This signal increases the speed of decrease of the brake fluid pressure. The locked or potentially locked wheel is then sufficiently released, thereby increasing the value of the signal $Wf$. The level of signal $Sf$ thus decreases.

It should be noted that the absolute value determining device 20a may be in the form of any device which responds to a signal exceeding one threshold value, such as $K$, and decreasing below another threshold value such as $-K$. Two separate Schmitt triggers or other types of devices may be used for this purpose.

When the signal $Sf$ decreases below the value $K$ at a time $t_5$, the absolute value determining device 20 stops producing the signal which energizes the coil 23a. This causes the means not shown to return the valve body 62 from its lowered position where it had allowed free passage of atmospheric pressure to the chamber 41a, to its uppermost position where the passage of air is obstructed by the passage 62a. Thus the speed at which the brake fluid pressure decreases is slowed down.

As the wheel velocity is restored, the signal $Sf$ becomes negative at the time $t_6$. At this point, the plus - minus discriminator also stops producing the output signal which energizes the coil 22a. This interrupts the pressure reducing function of the pressure modulator 25a and the brake fluid pressure begins to increase slowly. The signal $Wf$ now gradually approaches the signal $Vt$. At the same time the output signal $Wf'$ of the differentiator 13a increases with the acceleration of the wheels. At the time $t_7$ the signal $Sf$ becomes smaller than the level $-K$. This causes the absolute value determining means 20a again to produce an output signal which energizes the coil 23a of the velocity valve 60. The latter now opens to increase the brake fluid pressure rapidly.

When the acceleration of the wheels drops in response to the increase of the brake fluid pressure, and the signal $Sf$ rises higher than the level $-K$ at the time $t_8$, the absolute value determining means 20a again stops energizing the coil 23a. This slows down the speed at which the brake fluid pressure increases. After time $t_9$, the increase and decrease of the brake fluid pressure is repeated in the same manner as described. Thus the wheel velocity gradually approaches convergence with the reference velocity $Vt$. In this manner the wheel velocity is reduced at a predetermined deceleration.

According to another embodiment of the invention, the antiskid device controls only the two rear wheels rather than controlling all the four wheels. According to another embodiment of the invention, the rotational velocity of a propeller shaft is used. Furthermore, according to another embodiment, the control signal $Sf$ is obtained by performing the subtraction $Vt - Wf$ in subtracting means, subsequently differentiating the result in a differentiator, and finally adding the two terms $Vt - Wf$ and $Vt' - Wf'$ with respective multiplying factors $A_1$ and $A_2$. The latter method has the advantage of employing a smaller number of differentiators and adding circuits. However, it does not have the resistance to noise of the earlier described embodiments.

It should be noted that the selector 11b also may be operated with signals $Wc$ and $Wd$ in the mode described for selector 11a.

The memory circuit 102 may be in the form of a capacitor in parallel with the collector-emitter path of a transistor, all connected across a voltage corresponding to the signal $Wm$. The impedance of the transistor is controlled at the base to establish the time constant of the memory.

The invention provides an antiskid device which detects an accurate vehicle velocity irrespective of the road surface condition, the vehicle body inclination, etc. This occurs because in detecting the vehicle velocity, the system considers both the maximum wheel velocity of the four wheels as well as the wheel velocity deceleration.

Another advantage of the antiskid device according to the invention resides in the fact that the wheel velocity can be controlled relative to the vehicle velocity without drastic changes in the wheel velocity. This permits reliable antiskid control and avoids shocks while the brakes are applied.

Another advantage of the invention resides in the elimination of the possibility of wheel lock due to over-pressurizing the brake fluid, or an excessive drop in the brake force due to an over-reduction of brake fluid pressure. This is accomplished by varying the speed at which the brake fluid pressure is controlled on the basis of the relationship between the wheel velocity and the reference velocity.

While embodiments of the invention have been described in detail, it will be obvious to those skilled in the art that the invention may be embodied otherwise without departing from its spirit and scope.

What is claimed is:

1. An apparatus for modulating the brake force applied to the brakes of wheels of a vehicle, comprising:
   sensor means coupled to the wheels for forming wheel speed signals corresponding to the speeds of the wheels;
   circuit means coupled to said sensor means for establishing a wheel speed composite signal representing a composite of the speeds of the wheels and a reference signal derived from the speeds of the wheels and variable at a rate slower than the composite signal;
   control signal forming means coupled to said circuit means for producing a control signal representing a sum of a value proportional to both the positive and negative difference between the composite signal and the reference signal and a value proportional to both the positive and negative difference between the differential of the composite signal and the differential of the reference signal;
   modulating means responsive to said forming means for changing the force on the basis of the control signal; and
   modulation speed regulating means responsive to said forming means and coupled to said modulating means for varying the rate at which the modulating means modulates the force on the basis of the magnitude of the control signal.

2. An apparatus as in claim 1, wherein
   the vehicle includes other wheels and said sensor means are coupled to the other wheels for forming second wheel speed signals corresponding to the speeds of the other wheels;
   said circuit means including means for establishing a second wheel speed composite signal representing a composite of the speeds of the other wheels and deriving the reference signal from the speeds of all the wheels;
   said control signal means including means for producing a second control signal representing a combination of the difference between the second composite signal and the reference signal and the difference between the differential of the second composite signal and the differential of the reference signal;
   said modulating means including means for changing the braking force in the other wheels on the basis of the second control signal; and
   said regulating means including means for varying the rate at which the modulating means modulates the brake force on the other wheels on the basis of the magnitude of the second control signal.

3. An apparatus as in claim 2, wherein
   the first wheels of the vehicle are the front wheels and the second wheels of the vehicle are the rear wheels.

4. An apparatus as in claim 2, wherein
   said composite forming means selects the maximum wheel velocity of all the wheel velocity signals.

5. An apparatus as in claim 2, wherein
   said forming means includes first difference circuit means responsive to said composite signal and said reference signal for producing the difference between said composite signal and said reference signal;
   first differential circuit means for producing the differential of said composite signal;
   second differential circuit means for producing the differential of said reference signal; and
   second difference circuit means coupled to said first and second differential circuit means for producing the difference between the output of the differential.

6. An apparatus as in claim 2, wherein said modulation speed regulating means includes means for causing said modulating means to change the force at a first rate when the control signal has a value less than a predetermined absolute value and for changing the force at a second rate when the control signal exceeds the predetermined absolute value.

7. An apparatus as in claim 2, wherein
   said modulating means includes a discriminator to determine whether the value of the control signal is positive or negative;
   an electromagnet responsive to the discriminator;
   valve means responsive to said electromagnet for varying the pressure;
   second valve means for varying the rate at which said first valve means changes the pressure; and
   electromagnetic means coupled to said control signal forming means and responsive to the control signal for controlling said second valve means.

8. An apparatus as in claim 7, wherein
   said circuit means includes brake signal means responsive to the brake for indicating that the brake is being operated and low speed sensing means responsive to the composite signal for producing a low speed signal;
   said circuit means including gate means coupled to said brake indicator and said low speed sensing means and coupled to said electromagnet and electromagnetic means for disabling said electromagnet and said electromagnetic means unless the low speed sensing means and said indicating means produce signals indicating that the brake is being operated and the speed is below a predetermined value.

9. An apparatus as in claim 2, wherein
   said composite forming means selects the minimum wheel velocity of the wheel velocity signals.

10. An apparatus as in claim 2, wherein
    said composite forming means selects the arithmetic means of the wheel velocity signal.

11. An apparatus as in claim 2, wherein
    said composite forming means selects the geometric means of the wheel velocity signal.

12. An apparatus as in claim 1, wherein
    said circuit means includes composite signal forming means coupled to said sensor means and reference signal forming means coupled to said composite signal forming means;
    said reference signal forming means including memory means responsive to said composite signal forming means for causing the reference signal to vary at a rate slower than the composite signal.

13. An apparatus as in claim 12, wherein
    the vehicle includes other wheels and said sensor means are coupled to the other wheels for forming second wheel speed signals corresponding to the speeds of the other wheels;
    said circuit means including means for establishing a second composite signal representing a composite of the speeds of the other wheels and forming the reference signal from the speeds of all the wheels;
    said control signal means including means for producing a second control signal representing a combination of the difference between the second composite signal and the reference signal and the difference between the differential of the second composite signal and the differential of the reference signal;

said modulating means including means for changing the braking force in the other wheels on the basis of the second control signal; and said regulating means including means for varying the rate at which the modulating means modulates the brake force on the other wheels on the basis of the magnitude of the second control signal.

14. An apparatus as in claim 13, wherein
said composite signal forming means includes means for selecting the maximum wheel velocity of all the wheel velocity signals.

15. An apparatus as in claim 12, wherein
said reference signal forming means includes factor means for multiplying the output of said memory means by a predetermined fraction representing a desired ratio between a wheel velocity and a vehicle velocity.

16. An apparatus as in claim 15, wherein
the vehicle includes other wheels and said sensor means are coupled to the other wheels for forming second wheel speed signals corresponding to the speeds of the other wheels;

said circuit means including means for establishing a second composite signal representing a composite of the speeds of the other wheels and forming the reference signal from the speeds of all the wheels;

said control signal means including means for producing a second control signal representing a combination of the difference between the second composite signal and the reference signal and the difference between the differential of the second composite signal and the differential of the reference signal;

said modulating means including means for changing the braking force in the other wheels on the basis of the second control signal; and said regulating means including means for varying the rate at which the modulating means modulates the brake force on the other wheels on the basis of the magnitude of the second control signal.

17. An apparatus as in claim 16, wherein
said composite signal forming means includes means for selecting the maximum wheel velocity of all the wheel velocity signals.

18. An apparatus as in claim 15, wherein
said composite signal forming means includes means for selecting the maximum wheel velocity of all the wheel velocity signals.

19. An apparatus as in claim 15, wherein
said forming means includes first difference circuit means responsive to said composite signal and said reference signal for producing the difference between said composite signal and said reference signal;

first differential circuit means for producing the differential of said composite signal;

second differential circuit means for producing the differential of said reference signal; and second difference circuit means coupled to said first and second differential circuit means for producing the difference between the output of the differentials.

20. An apparatus as in claim 12, wherein
said composite signal forming means includes means for selecting the maximum wheel velocity of all the wheel velocity signals.

21. An apparatus as in claim 20, wherein
said forming means includes first difference circuit means responsive to said composite signal and said reference signal for producing the difference between said composite signal and said reference signal;

first differential circuit means for producing the differential of said composite signal;

second differential circuit means for producing the differential of said reference signal; and second difference circuit means coupled to said first and second differential circuit means for producing the difference between the output of the differentials.

22. An apparatus as in claim 20, wherein
said modulation speed regulating means includes means for causing said modulating means to change the force at a first rate when the control signal has a value less than a predetermined absolute value and for changing the force at a second rate when the control signal exceeds the predetermined absolute value.

23. An apparatus as in claim 12, wherein
said forming means includes first difference circuit means responsive to said composite signal and said reference signal for producing the difference between said composite signal and said reference signal;

first differential circuit means for producing the differential of said composite signal;

second differential circuit means for producing the differential of said reference signal; and second difference circuit means coupled to said first and second differentail circuit means for producing the difference between the output of the differentials.

24. An apparatus as in claim 12, wherein said modulation speed regulating means includes means for causing said modulating means to change the force at a first rate when the control signal has a value less than a predetermined absolute value and for changing the force at a second rate when the control signal exceeds the predetermined absolute value.

25. An apparatus as in claim 1, wherein
said circuit means including selector means for extracting the maximum one of the wheel speeds $W$;

said circuit means including means for generating a signal $Wm$ from the maximum one of the wheel speeds, memory means responsive to the signal $Wm$ for producing a signal $Vo$ slower than $Wm$, and factor setting means for producing the reference signal $Vt$ at a value between 0.8 to 0.85 Vo;

said control signal forming means including computational means for producing a value $S_f = A_1(Vt - W) + A_2(Vt' - W')$, wherein $A_1$ and $A_2$ are predetermined factors.

26. An apparatus as in claim 25, wherein
said composite signal forming means includes means for selecting the maximum wheel velocity of all the wheel velocity signals.

27. An apparatus as in claim 26 wherein
said forming means includes first difference circuit means responsive to said composite signal and said reference signal for producing the difference between said composite signal and said reference signal;
first differential circuit means for producing the differential of said composite signal;
second differential circuit means for producing the differential of said reference signal; and
second difference circuit means coupled to said first and second differential circuit means for producing the difference between the output of the differentials.

28. An apparatus as in claim 27, wherein said modulation speed regulating means includes means for causing said modulating means to change the force at a first rate when the control signal has a value less than a predetermined absolute value and for changing the force at a second rate when the control signal exceeds the predetermined absolute value.

29. An apparatus as in claim 28, wherein
said modulating means includes a discriminator to determine whether the value of the control signal is positive or negative;
an electromagnet responsive to the discriminator;
valve means responsive to said electromagnet for varying the pressure;
second valve means for varying the rate at which said first valve means changes the pressure; and
electromagnetic means coupled to said control signal forming means and responsive to the control signal for controlling said second valve means.

30. An apparatus as in claim 26, wherein
said modulation speed regulating means includes means for causing said modulating means to change the force at a first rate when the control signal has a value less than a predetermined absolute value and for changing the force at a second rate when the control signal exceeds the predetermined absolute value.

31. An apparatus as in claim 25, wherein
said forming means includes first difference circuit means responsive to said composite signal and said reference signal for producing the difference between said composite signal and said reference signal;
first differential circuit means for producing the differential of said composite signal;
second differential circuit means for producing the differential of said reference signal; and
second difference circuit means coupled to said first and second differential circuit means for producing the difference between the output of the differentials.

32. An apparatus as in claim 25, wherein said modulation speed regulating means includes means for causing said modulating means to change the force at a first rate when the control signal has a value less than a predetermined absolute value and for changing the force at a second rate when the control signal exceeds the predetermined absolute value.

33. An apparatus as in claim 1, wherein
said forming means includes first difference circuit means responsive to said composite signal and said reference signal for producing the difference between said composite signal and said reference signal;
first differential circuit means for producing the differential of said composite signal;
second differential circuit means for producing the differential of said reference signal; and
second difference circuit means coupled to said first and second differential circuit means for producing the difference between the output of the differentials.

34. An apparatus as in claim 33, wherein
said modulation speed regulating means includes means for causing said modulating means to change the force at a first rate when the control signal has a value less than a predetermined absolute value and for changing the force at a second rate when the control signal exceeds the predetermined absolute value.

35. An apparatus as in claim 1, wherein said modulation speed regulating means includes means for causing said modulating means to change the force at a first rate when the control signal has a value less than a predetermined absolute value and for changing the force at a second rate when the control signal exceeds the predetermined absolute value.

36. An apparatus as in claim 1, wherein
said modulating means includes a discriminator to determine whether the value of the control signal is positive or negative;
an electromagnet responsive to the discriminator;
valve means responsive to said electromagnet for varying the pressure;
second valve means for varying the rate at which said first valve means changes the pressure; and
electromagnetic means coupled to said control signal forming means and responsive to the control signal for controlling said second valve means.

37. An apparatus as in claim 36, wherein said electromagnetic means includes double threshold forming means for forming two thresholds responsive to said control signal and for producing a first determining signal when the control signal is between the thresholds and a second signal when the control signal is outside the threshold;
said electromagnetic means including an electromagnet responsive to said threshold means;
said second valve means being movable by said electromagnetic means between a first position wherein the change of pressure is at a first level in response to the first determining signal and the change of pressure is at a less rapid level in response to a second determining signal.

38. An apparatus as in claim 1, wherein
said circuit means including selector means for extracting the lower of the wheel speeds W;
said circuit means including means for generating a signal Wm from the minimum of the wheel speeds, memory means responsive to the signal $Wm$ for producing a signal Vo slower than $Wm$, and factor sensing means for producing the reference signal $Vt$ at a value between 0.8 to 0.85 Vo;
said control signal forming means including computational means for producing a value $S_f = A_1 (Vt - W) + A_2(Vt' - W')$, where $A_1$ and $A_2$ are predetermined factors.

* * * * *

UNITED STATES PATENT OFFICE
CERTIFICATE OF CORRECTION

Patent No. 3922022            Dated November 25, 1975

Inventor(s)      Takeshi Ochiai

It is certified that error appears in the above-identified patent and that said Letters Patent are hereby corrected as shown below:

In the heading of the Patent [[73] should read as follows:

--[73] Toyota Jidosha Kogyo Kabushiki Kaisha,

Aichi-ken, Japan--.

*Signed and Sealed this*

*twenty-fourth* Day of *February 1976*

[SEAL]

Attest:

RUTH C. MASON
*Attesting Officer*

C. MARSHALL DANN
*Commissioner of Patents and Trademarks*